Feb. 22, 1927. 1,618,363
D. M. CLARK
COMBINATION SANITARY AUTOMATIC CREAMER ATTACHMENT FOR COFFEE URNS
Original Filed May 25, 1925   2 Sheets-Sheet 2
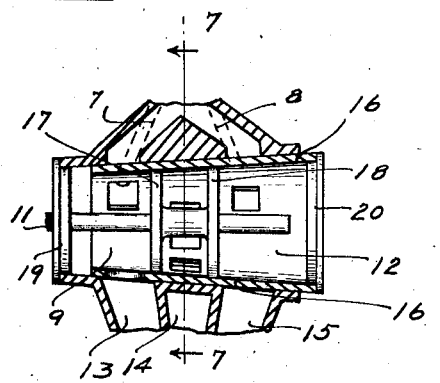
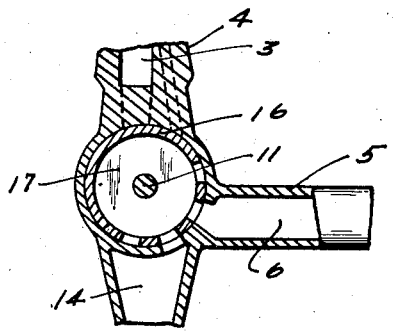
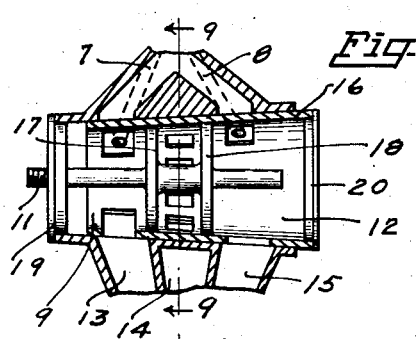
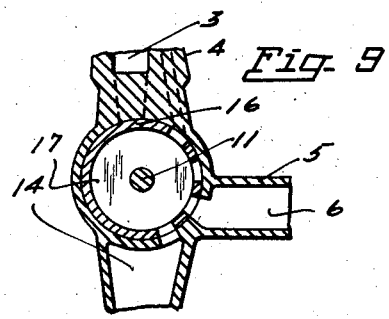
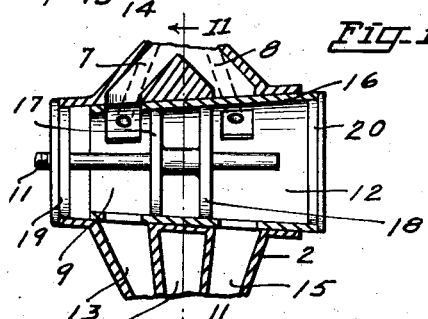
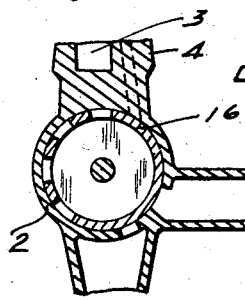
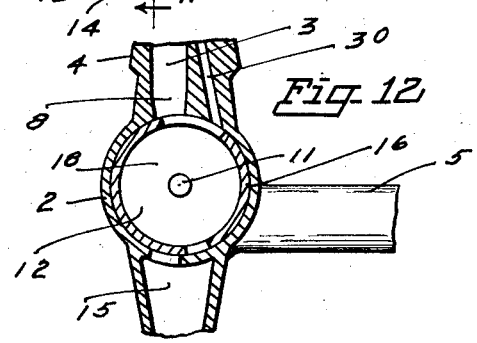
Inventors
Dolph M. Clark
By Attorney Patented Feb. 22, 1927.

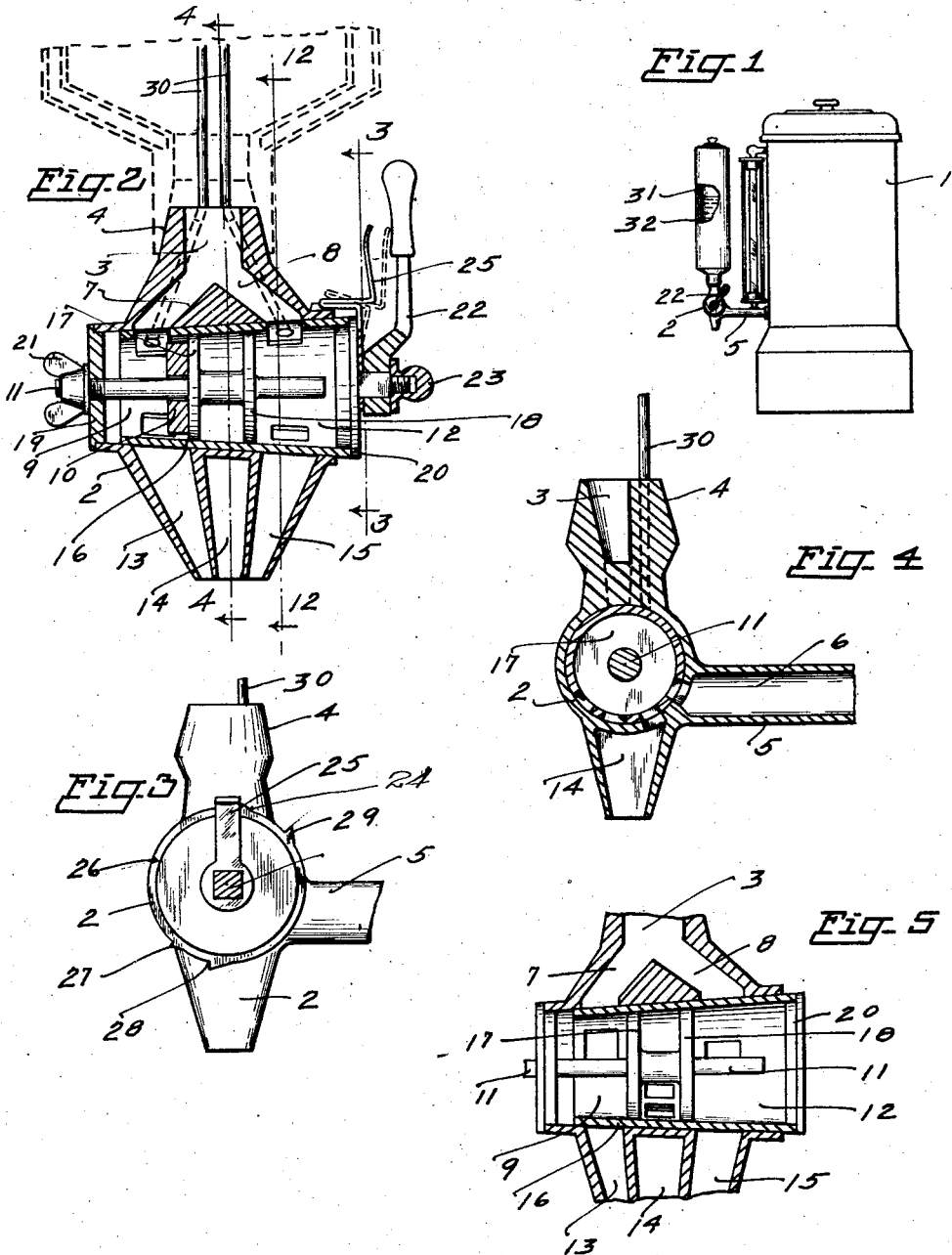

1,618,363

UNITED STATES PATENT OFFICE.

DOLPH MELVIN CLARK, OF PORTLAND, OREGON, ASSIGNOR TO ORPHA HARBAUGH AND MRS. A. P. CLARK, BOTH OF PORTLAND, OREGON.

COMBINATION SANITARY AUTOMATIC CREAMER ATTACHMENT FOR COFFEE URNS.

Application filed May 25, 1925, Serial No. 32,706. Renewed October 23, 1926.

My present invention is an improvement over my pending application, filed in the United States Patent Office, under date of February 26, 1924, Serial Number 695,197, for sanitary coffee creamer.

My present invention is intended for use in coffee drinking places, eating houses, restaurants, and in any and every place where coffee, as a beverage is served to the customers of the establishment, and consists primarily of a hand manipulated outlet adapted to the serving of coffee without cream dilution also adapted to the serving of cream for other purposes and without dilution with coffee. Coffee may be dispensed through the hand manipulated control device in a predetermined amount desired and when the hand manipulated control dispensing device is once set the same may not be altered or changed and will give at all times, irrespective of the amount of cream maintained within the cream receptacle, a specified measured amount of cream, which may be in an amount of one-fifth, of cream, to four-fifths of coffee. The device may also be made to dispense the so-called one-half cream and one-half coffee, the amount of cream to be predetermined at the time the controlling device is set.

A further object of my invention consists in the forming of a device of this kind with the fewest number of parts, one that will not easily get out of order and one that may be maintained in a sanitary and clean condition at all times.

A further object of my invention consists in a simple and efficient hand manipulative device adapted to securement to the dispensing side of coffee urns, as now generally in use in eating places, and is adapted to the placing of a cream container thereupon and one that may easily be removed therefrom.

With these and incidental objects in view, the invention consists in certain novel features of construction and combination of parts, the essential elements of which are set forth in the appended claims and to a preferred form of embodiment of which is hereinafter shown with reference to the drawings which accompany and form a part of this specification.

In the drawings:—

Fig. 1 is a side elevation of my device shown in place upon a coffee making machine, with the cream receptacle partially in section, to illustrate the side wall construction of the same.

Fig. 2 is an enlarged sectional view, through the dispensing hand manipulative device, illustrating the construction of the same in detail, and the method of attaching the cream receptacle thereto.

Fig. 3 is an end view of the mechanism, shown in Fig. 2 taken on line 3—3 of Fig. 2, looking in the direction indicated.

Fig. 4 is a sectional end view, taken on line 4—4 of Fig. 2, looking in the direction indicated, and the valve core is shown in position for the dispensing of black coffee.

Fig. 5 is a partial sectional front view, made to illustrate the valve shut-off control, the valve core is shown in position for the dispensing of black coffee.

Fig. 6 is a partial, sectional, side elevation, of the valve mechanism, made to illustrate the valve in position for the drawing of an admixture of a small amount of cream, with sufficient coffee to fill a cup therefrom.

Fig. 7 is a cross sectional view, taken on line 7—7 of Fig. 6, looking in the direction indicated, the valve core is shown in position for the dispensing of coffee with a regular amount of cream.

Fig. 8 is a cross sectional view made to illustrate the position of the valve control mechanism when coffee and cream are being dispensed therethrough in like amounts; the valve core is shown in position for the dispensing of one-half cream and one-half coffee.

Fig. 9 is a sectional view, taken on line 9—9 of Fig. 8, looking in the direction indicated.

Fig. 10 is a cross sectional view, through through the mechanism, made to show the location of the valve when the same is being used in the dispensing of cream only.

Fig. 11 is a sectional view, taken on line 11—11 of Fig. 10, looking in the direction indicated, showing the location of the valve when the same is being used to dispense cream only.

Fig. 12 is a sectional view, taken on line

12—12 of Fig. 2, looking in the direction indicated, made to illustrate the venting of the cream receptacle, to compensate for the cream being drawn therefrom; the valve core is here shown in position for the filling of the cream container within the core but not in position for the dispensing of cream therefrom.

Like reference characters refer to like parts throughout the several views.

1 is the coffee urn of the usual commercial type, having disposed at a convenient location thereupon my new and improved device, which consists primarily of a valve frame 2, having an inlet 3, disposed upon the upper part thereof, and a ground tapered face 4, adapted to the placing of a cream container thereupon. The valve frame has a piping connection 5, disposed upon the rear, adapted to a threaded and locking engagement with the shell of the coffee urn and having an inner passage 6, therein for the passage of the beverage therethrough from the coffee urn. The valve frame has a dual port adapted to the passage of cream through each port, as shown at 7 and 8. The port 7, conducts cream into the valve chamber 9, when coffee is to be dispensed containing the usual and ordinarily small amount of cream dilution. A filler 10 is disposed about the valve stem 11, whereby the user of the device may regulate the amount of cream to be admitted into the coffee. Fillers of larger or smaller volume may be used to suit the requirement of the user of the same. The port 8, leads into the valve chamber 12, adapted to the dispensing of half coffee and half cream; disposed upon the lower parts of the valve frame are ports 13, 14, and 15. Cream only is dispensed through the port 13. Coffee only is dispensed through the port 14, and where half and half is to be dispensed, the cream flows through ports 13 and 15 at one and the same time. A valve core 16 is adapted to sliding engagement within the valve and of the usual commercial ground fit, the valve frame having stem 11 extending therethrough at one end of the valve, and the valve having partition walls 17 and 18 to form within the valve chamber three separate and distinct compartments. A head 19 is disposed on one end of the valve stem and a head 20 upon the other end of the valve to complete a valve core unit. Valve stem 11, terminates on its one end with a threaded locking screw 21. The manipulative handle 22, which is secured to the head 20 by the lock nut 23 is adapted to rotate the valve core and when in the position, as shown in Fig. 3, all pouring ports are closed, the same being located against lug 24, by the locking spring 25, adapted to engagement therewith.

If black coffee is to be dispensed through the device, the manipulative handle 22 is turned to the notch 26, disposed upon the periphery of the valve frame.

If creamed coffee of the usual amount of cream dilution is to be served, the manipulative handle is turned until the locking spring engages with lug 27.

If half coffee and half cream are to be dispensed, the manipulative handle is turned until the locking spring 25 engages with lug 28, at which time cream will be dispensed through the valve chamber 9, and the valve chamber 12, and coffee will be drawn through the port 14.

If cream only is to be dispensed through the valve, the manipulative handle is turned until the spring stop 25 engages with the lug 29, in which position cream only will flow through the port 7, the valve chamber 9, and the outlet port 13. Cream may also flow from the chamber 12, and flow through the outlet 15, thus giving a volume flow at one and the same time through the two outlets 13 and 15.

A vent pipe 30 is so disposed as to permit air to flow into the cream container to compensate for the amount of cream being withdrawn therefrom.

To maintain the cream in a cool and sanitary condition, I provide a cream container, having a doubled wall space as shown at 31 and 32 in Fig. 1, with an air space therebetween.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. A combination sanitary automatic creamer attachment for coffee urns, comprising a valve frame, having a valve chamber disposed therein, a valve core disposed within the valve chamber, handle means adapted to rotate the valve core, partition walls disposed within the valve core, heads disposed upon the valve core and valve frame and adapted with the partition walls to create closed chambers within the core and valve chamber, a locking spring disposed upon the valve core and adapted to position the valve core, and inlet and outlet ports adapted to the passage of cream and coffee therethrough.

2. A combination sanitary automatic creamer attachment for coffee urns, comprising a valve frame, having a chamber within said frame, a tapered face upon the upper end of the valve frame, adapted to engagement with a cream container, a series of inlet and outlet ports in the valve frame connecting with the valve chamber, a valve core disposed within the valve chamber and adapted to close selected ports, a valve stem disposed centrally of the valve core, partition walls disposed within said valve core and creating compartments therein, a head disposed at one end of the valve core and adapted to the inner diameter of the valve chamber; a manipulative handle mounted on the valve core head, a locking spring adapted to the valve core head and engaging with stops located upon the outer surface of the valve frame, outlet ports in said core adapted to register with outlet ports in the valve chamber, and vent pipes adapted to the admission of air within the cream container.

3. A combination sanitary automatic creamer attachment for coffee urns, comprising a valve frame, adapted for attachment to a coffee urn and for the passage of a liquid coffee therethrough, having a chamber disposed within the valve frame, a valve core disposed within the valve chamber, a cream container disposed upon the valve frame, said frame having inlet and outlet ports adapted to the passage of cream into and from the valve chamber, means for positioning the valve core within the valve chamber; partition walls disposed within the valve core to create compartments within the valve chamber and valve core, spring means disposed on the valve core head adapted to locate ports leading into and from the compartments within the valve chamber and a manipulative handle adapted to open and close the valve ports by rotating the valve core.

DOLPH MELVIN CLARK.